United States Patent [19]

Lynch

[11] Patent Number: 5,243,765
[45] Date of Patent: Sep. 14, 1993

[54] PORTABLE TRUING SYSTEM

[75] Inventor: Shane D. Lynch, Tacoma, Wash.

[73] Assignee: Lynch & Friedman, A Partnership, Tacoma, Wash.

[21] Appl. No.: 904,972

[22] Filed: Jun. 26, 1992

[51] Int. Cl.[5] .............................................. G01B 5/255
[52] U.S. Cl. ..................................... 33/203.19; 33/203
[58] Field of Search ................ 33/203, 203.19, 203.18, 33/203.2

[56] References Cited

U.S. PATENT DOCUMENTS

| | | |
|---|---|---|
| 451,053 | 4/1891 | Jackman . |
| 621,153 | 3/1899 | Schmidt ........................... 33/203.19 |
| 640,607 | 1/1900 | Wardwell ..................... 33/203.19 X |
| 1,073,042 | 9/1913 | Heller .............................. 33/203.19 |
| 2,402,041 | 6/1946 | Greenleaf et al. . |
| 3,956,829 | 5/1976 | Moxon ............................. 33/203.19 |

FOREIGN PATENT DOCUMENTS

| | | |
|---|---|---|
| 492815 | 2/1930 | Fed. Rep. of Germany . |
| 605953 | 11/1934 | Fed. Rep. of Germany ... 33/203.19 |
| 668900 | 12/1938 | Fed. Rep. of Germany ... 33/203.19 |

*Primary Examiner*—Thomas B. Will

[57] ABSTRACT

The apparatus of the present invention includes a body that may be attached by straps to a structural member of a vehicle having a spoked wheel. The body carries an indicator that may be moved relative to the body. The indicator extends towards the rim of the bicycle to indicate the position of the rim with respect to the structural member of the bicycle. The indicator shows areas of the rim that are not true and which require adjustment. The tension of corresponding spokes can then be adjusted to bring the wheel into "true". Also included in the present invention is a method of truing a bicycle wheel including the steps of fastening the system to a structural member of the bicycle, aligning the indicator with the rim of a wheel, adjusting the indicator to contact the rim of the wheel, rotating the wheel to determine contact points between the rim and the indicator and adjusting the spoke tension to achieve uniform contact between the rim and the indicator.

4 Claims, 4 Drawing Sheets

PORTABLE TRUING SYSTEM

BACKGROUND OF THE INVENTION

1. Field of the Invention

This invention relates to the adjustment of wheels and more specifically to the truing of bicycle tire rims wherein the rims are supported by spokes.

2. Description of the Prior Art

It has long been a problem with all wheels having rims supported by spokes to maintain the rim in a true or a straight position and in the proper roundness. Because of the lightness of the rims and the nature of spoke-type construction, the rims are susceptible to transverse deformation and deformation of the roundness.

Attempts have been made in the past to provide an effective and relatively easy means of "truing" rims; in other words, aligning the rim by manipulation of the spokes until the rim is perfectly round and lies in a flat plane. A non-true rim produces increased wobble as the spin of the wheel increases, affects steering control, increases wear on the tire and generally has an overall deleterious effect on the operation and performance of the bicycle.

Nothing in the prior art, alone or in combination, is thought to teach or suggest the portable truing system of the present invention. Relevant patents are as follows:

Jackman, U.S. Pat. No. 451,053, discloses a tire gauge for determining wear on tires. The instrument finds the location and extent of wear of a tire. The invention includes a sliding rod having a hooked upper end terminating at a point that contacts the surface tire. The other end of the rod is attachable to the axle of the wheel. Also included is an adjusting screw that provides a means for maintaining the rod parallel to the side of the wheel. When it is determined that the tire is worn to a certain state, the tire may be removed and trued.

Greenleaf. et al., U.S. Pat. No. 2,402,041, discloses a wheel attachment of checking wheel-roll of multi-wheeled vehicles. The attachment includes a body with an opening therein which may be attached on the axis of the wheel. The body is supported from the ground by means of a wheel connected to the body by a bracket and by a tracer wheel.

Mielewerke, German Patent No. 492,815 discloses a stationary device for checking the contour of a spoked wheel.

OBJECTS AND SUMMARY OF THE INVENTION

To overcome the problems inherent in the prior art, the present invention sets forth a light-weight, simplified apparatus which can be temporarily or permanently affixed to a structural member connected to the axle of a spoked wheel. The apparatus includes means for attachment to a structural member of a vehicle. The apparatus comprises an indicator means that uses the structural member as a reference to extend to, and contact, the rim of the wheel being "trued". Rotation of the rim relative to the indicator shows the areas of the rim that are not "true" and which require adjustment. The user can then quickly, easily, and accurately adjust the tension of the spokes until the rim is properly aligned, or trued, and is in the proper rounded position.

The present invention also includes a method for "truing" the rim of a spoked wheel comprising fastening the apparatus to a structural member of the vehicle, positioning the apparatus properly with respect to the rim of the wheel, adjusting the indicator means to contact the rim of the wheel, adjusting the wheel by tightening or loosening spokes, rotating the wheel toward the next spoke position on the wheel, and continuing to rotate the wheel and adjust the spokes of the wheel relative to the indicator means until the wheel is "true".

Thus, the portable truing system of the present invention provides an apparatus and method for truing a spoked wheel. The simple and easy to use apparatus and method of the present invention is beneficial to cyclists because a "trued" wheel provides for more efficient cycling. The portable truing system of the present invention permits truing of the wheel without removing the wheel from the vehicle thus promoting more frequent "truing".

A primary object of the present invention is to provide a simple, cheap, lightweight and easy to use system for truing the rims of spoke wheels.

Another object of the present invention is to provide an accurate means of truing a spoked wheel on a vehicle by using a rugged truing system that does not require constant delicate adjustments.

Still another object of the present invention is to provide a durable truing system that can withstand rough handling and which can, if desired, be permanently mounted on the vehicle and yet withstand the various operating environments that the vehicle will be associated with, without deterioration.

An object of the invention is to provide a truing system that does not require the use of any special tools and, at most, requires the use of only simple tools such as a screwdriver and/or a pair of pliers.

Still another object to the present invention is to provide a truing system that can be permanently installed on the vehicle and yet is unobtrusive and small enough so as not to interfere with the rider of the vehicle or to interfere with other equipment mounted on the vehicle.

Yet another object of the invention is to provide a truing system which will not scratch, damage, or permanently mark the rim of a tire or frame of the vehicle to which the truing system is attached.

Another object of the present invention is to provide a truing system that can be used to true a spoked wheel from either or both sides of the wheel.

An additional object of the present invention is to provide a simple, easy to perform method of truing a spoked wheel.

A primary object of the present invention is to provide a quick method for checking the roundness of a wheel to ensure that the wheel is properly trued without requiring the user to estimate or approximate the roundness of the wheel.

A further object of the present invention is to provide a method of truing a spoked wheel without the need for any tools, or at most a few simple tools such as a screwdriver or a pair of pliers.

Still another object of the present invention is to provide a method of truing a spoked wheel, front or back, without removing the wheel from the vehicle.

DESCRIPTION OF THE DRAWINGS

These and further objects of the present invention will become apparent to those skilled in the art from a review of the following Detailed Description of the Invention and accompanying drawings in which.

DETAILED DESCRIPTION

Figure 1:
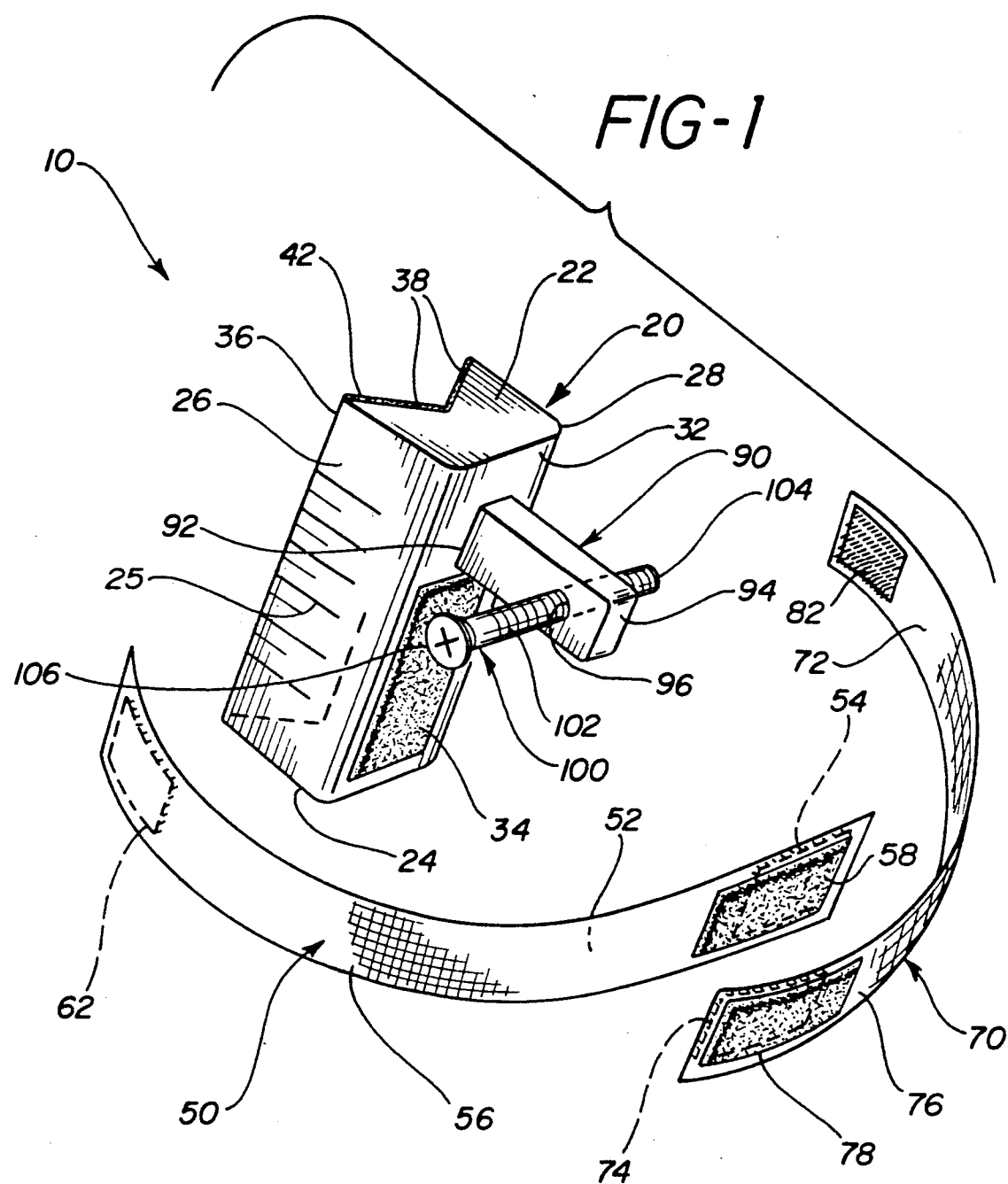
FIG. 1 is a perspective view of the portable truing system of the present invention showing the various components.

The portable truing system of the present invention, shown in FIGS. 1–4 and indicated generally as 10, provides a method and apparatus for truing a spoked wheel. With this system, one may determine which spokes of a spoked wheel, such as a bicycle wheel, or the like, need to be adjusted to restore the wheel to its truing plane. The portable truing system, as illustrated in FIG. 1, comprises a block 20, an upper strap 50, a lower strap 70, an arm 90, and an indicator screw 100.

The block 20 is attachable to a structural or frame member of a vehicle having spoked wheels. This structural member is typically one leg of a bicycle fork 130, FIG. 2. The block 20 has a top 22, a bottom 24, a remote side 26, a proximate side 28, a front side 32, and a rear side 36. Typically, the block 20 is fastened to a bicycle fork by means of straps 50 and 70 having hook and pile-type fastening means. Likewise, typically attached to the lower section of the front side 32 of the block 20 is a fastening means for attaching block 20 to straps 50 and 70. This fastening means is typically one of a hook and pile fastener 34 that is securely glued or otherwise permanently attached to the block 20. Mating fasteners 54 and 74 are attached to straps 50 and 70, respectively.

On the rear side 36 of block 20 a V-notch 38 may be formed to facilitate mounting of the apparatus to a structural member. This notch may be provided with a lining 42 composed of rubber or other material to protect the structural or frame member to which the block 20 is attached from being scratched or abraded by the block 20.

As shown in FIG. 1, it may be desirous to include indicia means 25 on block 20. The indicia means can be used to position the block 20 in the appropriate place along a structural member. As such, it would be desirable to include indicia means 25 along a surface of the block that is visible when the block is mounted to a structural member of the vehicle, i.e., on the remote side 26 of the block 20. Such an indicia means may be useful in determining the roundness of the wheel during the process of truing the wheel, and may help to position the apparatus if it is desired to move the apparatus to a structural member on the opposite side of the wheel.

Attached to the upper section of the front side 32 of block 20 is an arm 90. The arm 90 is typically a rectangular block extending perpendicularly from the front side 32 of the block 20. The arm 90 comprises a base 92 which mates with and attaches to the front side 32 of the block 20, an end 94, and an indicator positioning means, typically a threaded passage 96. Threaded passage 96 forms a collinear bore that parallels the front side 32 of the block 20.

Threaded passage 96 coacts with and positions indicator means, typically indicator screw 100. Indicator screw 100 comprises a threaded shank 102, a contacting tip 104, and an adjustment head 106. One may use the adjustment head 106 to advance or retract the contacting tip 104 with respect to arm 90. In the embodiment shown in FIG. 1, adjustment head 106 contains a receptacle that may be operated with a screwdriver. In this embodiment, the user inserts a screwdriver into adjustment head 106 and rotates indicator screw 100 to cause the threaded shank 102 to move into or out of threaded passage 96. In alternative embodiments, a slotted adjustment head, a knurled knob adjustment head, a thumbscrew adjustment head, or the like, can be used so that the indicator screw can be manually adjusted by the user or adjusted with a simple tool such as a screwdriver.

In the preferred embodiments, an upper strap 50 and a lower strap 70 are used to securely attach the block 20 to the fork 130 or similar structural member of the vehicle. Each of the upper and the lower straps comprises an inner side 52 and 72, having means for attachment of the strap to the block (54 and 74), typically one of a hook and pile fastening element, and an outer side 56 and 76, having hook and pile fastening means, 58, 78, 62 and 82 respectively. The fastener 54 of the upper strap 50 is designed to mate with the upper section of the fastener 34 on the block 20. This upper strap is then wrapped around the block 20 and the fork 130 of the vehicle until fastener 62 overlays and is mated with fastener 58.

Fastener 62 is fastened to the inner side 52 of the strap 50 at the end opposite the fastener 54. The fastener 54 is attached to the inner side 52 of the upper strap 50 at the same end as fastener 58. Fastener 58 which mates with fastener 62 is attached to the outer surface 56 of the upper strap 50.

By using an elastic strap and/or by selecting an appropriate length for the strap, or by extending the length of fastener 58, the upper strap 50 can be used to fasten the block 20 to structural members of various sizes, such as the fork arms or triangular members supporting the rear wheel. The upper strap 50 is typically placed immediately below the arm 90 and wrapped snugly around the fork 130, or other structural member to which the block 20 is to be attached.

To provide a more secure attachment of the apparatus to the structural member, a lower strap 70 may also be used. Such a strap 70 would be attached to the lower section of the fastener 34, FIG. 2 of block 20 just below the upper strap 50. The lower strap 70 would be identical to the upper strap 50 but would be wrapped around block 20 and frame 130 in the opposite direction of upper strap 50. The lower strap is comprised of an inner side 72, an outer side 76, a block fastener 74 which mates with the lower section of the front fastener 34 on the block 20, and hook and pile fasteners 78 and 82.

Prior to tightening straps 50 and 70, the block 20 is positioned on the fork until the contacting tip 104, of the indicator means is aligned with the rim 160 of the wheel 140. If necessary, the indicator screw 100 is advanced or retracted by rotating the adjustment head 106 in either a clockwise or counterclockwise direction until the contacting tip 104 touches the rim of the wheel. When indicia means are included on the block, the block may be aligned with the corresponding indicia on the structural member, if any.

To true the wheel, the wheel is rotated and variations in the gap between the wheel rim 160 and the contacting tip 104 are observed. The wheel can be moved from one spoke 170 position to the adjacent spoke position and the gap between the rim 160 and the contacting tip 104 visually checked. Wherever a gap appears, the corresponding spoke is tensioned by using a wrench on the wrench flat 176 to either tighten or loosen the spoke shaft 172. Rotation of the wrench flat 176 causes the spoke shaft 172 to advance or retract into the spoke head 174. Advancing the spoke shaft 172 increases the tension on the spoke shaft and on the rim 160 of the wheel. Retracting the spoke shaft 172 decreases the tension of the spoke shaft and thus the tension on the rim 160.

To true the wheel in an alternative embodiment, the indicator screw 100, is adjusted until the contacting tip 104 touches the rim 160 of the wheel 140. The indicator screw 100 is then backed off about one half turn. The wheel is turned until the rim touches the contacting tip 104. The tension of the corresponding spoke is adjusted to true the wheel. This adjustment is accomplished by rotating the wrench flat 176, to increase or decrease the tension on the spoke shaft 172. This change in tension will cause the gap between the rim 160 and the contacting tip 104 to change. By rotating the wheel around its full circumference and adjusting the corresponding spokes until the gap between the rim 160 and the contacting tip 104 is virtually the same, the wheel will be straightened to the truing plane of the wheel 180, FIG. 3 and thus be properly "trued."

Figure 2:
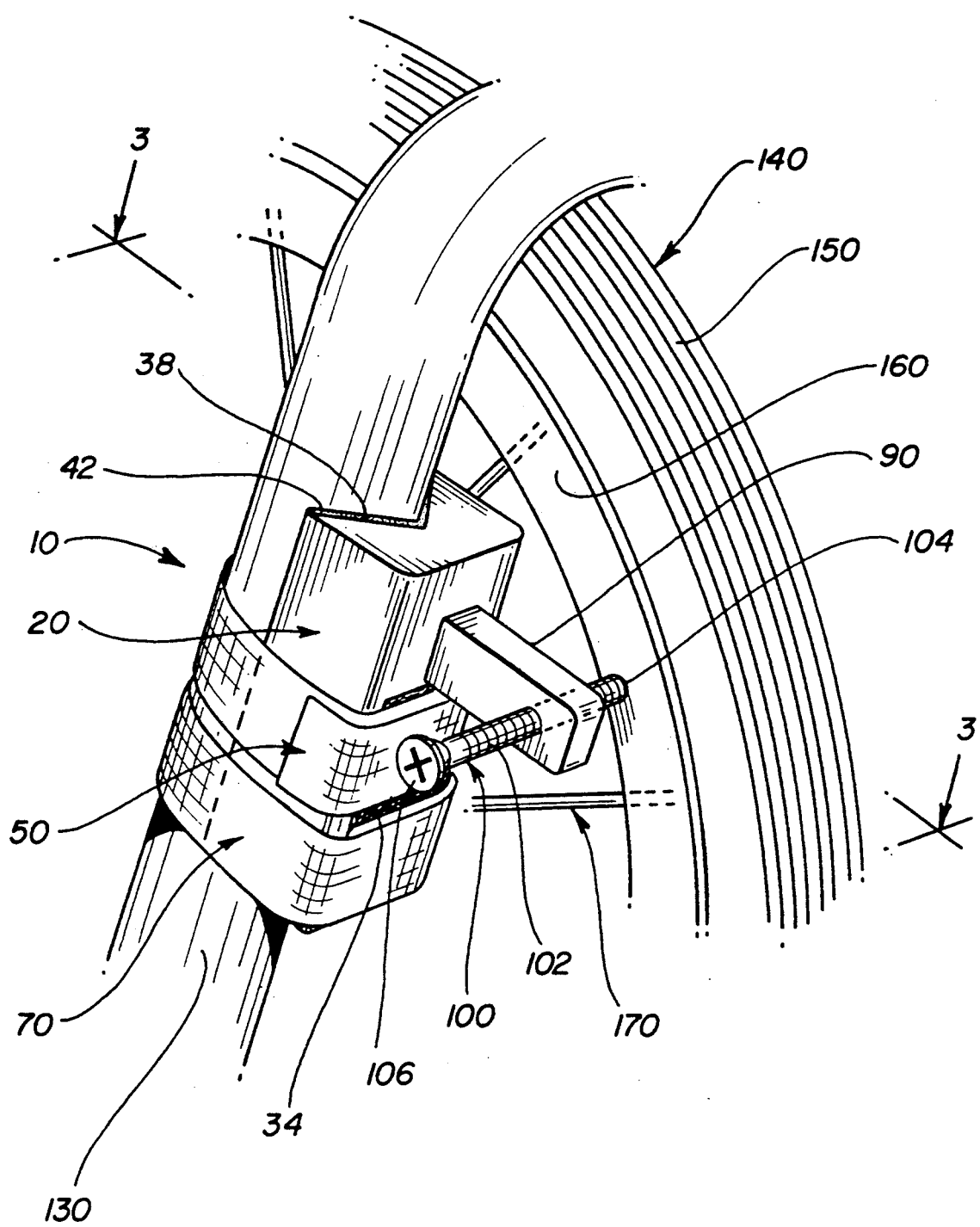
FIG. 2 is a perspective view of the portable truing system of FIG. 1 mounted on one arm of a fork of a bicycle and showing the indicator screw in contact with the rim of a bicycle spoked wheel.
Figure 3:
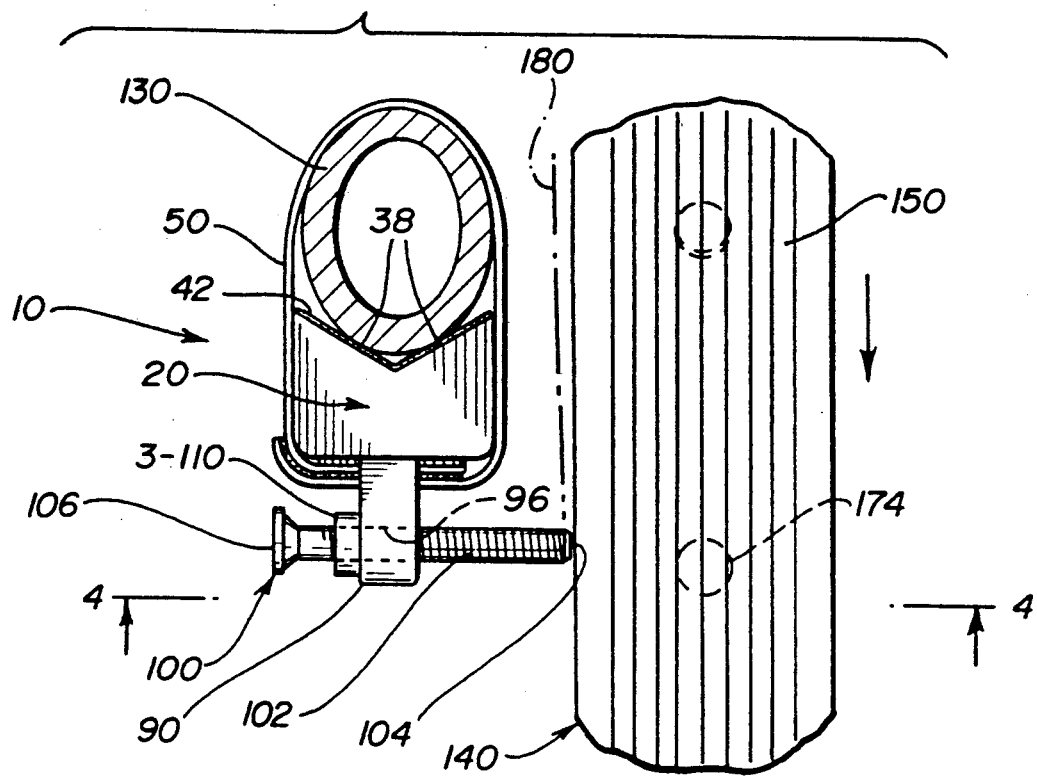
FIG. 3 is a top, partial cross-sectional view of the portable truing of FIG. 2 system illustrating the gap between the tip of the indicator screw and the rim of a rotating wheel.
Figure 4:
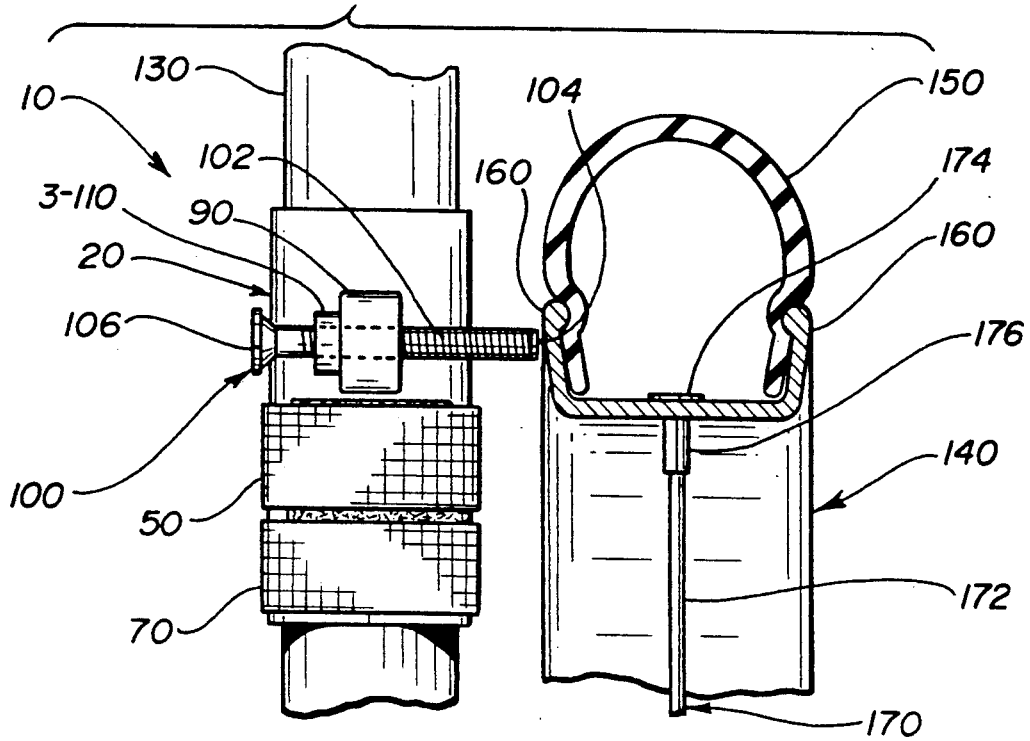
FIG. 4 is a side, view of the portable truing system of FIG. 3 illustrating a cross-section of the bicycle wheel and the interaction of the wheel rim with the bicycle truing system.

To further verify that wheel truing has been achieved or to further fine tune the wheel truing, the portable truing system can be removed from the one arm of the fork 130, FIG. 2 and placed on the opposite arm of the fork. The same process as previously described is then repeated to ensure that the plane of the wheel is properly aligned to the truing plane of the wheel.

Rotation of the wheel and constant contact between the wheel and the indicator screw 100 may change the position of the indicator screw 100. To guard against this, a locking nut 3-110, FIG. 3 may be added to the indicator screw. This locking nut 3-110 is threaded onto the indicator screw 100 and then the indicator screw is threaded through the threaded passage 96 of the arm 90. In use, the indicator screw 100 is adjusted until the contacting tip 104 touches the rim 160 of the wheel 140. The indicator screw 100 is then backed off about one-half turn. The locking nut 3-110 is then rotated along the threaded shank 102 until it comes into firm contact with the surface of arm 90. Locking nut 3-110 coacts with the surface of arm 90 and the threaded shank 102 to prevent the indicator screw 100 from rotating out of adjustment due to rotational contact with the rim of a rotating wheel.

In the embodiment of the invention comprising indicia means 25 on the block, the indicia means may be used to properly align the block so that the indicator means is positioned properly with respect to the rim. In this embodiment, the structural member of the bicycle on which the apparatus 10 is mounted, may include a mark or series of marks by which the apparatus 10, via the indicia means 25, may be properly aligned. Additionally, the indicia means 25 may provide the user of the apparatus with an indication of the amount of the degree of which a wheel is "out-of-round". Additionally, the indicia means may be useful when the truing procedure has been finished at one side of the wheel and the apparatus is to be transferred to the opposite side of the wheel for fine tuning the truing of the wheel. As such, the indicia means may help to indicate the proper positioning of the apparatus 10 on the opposite side of the wheel.

Figure 5:
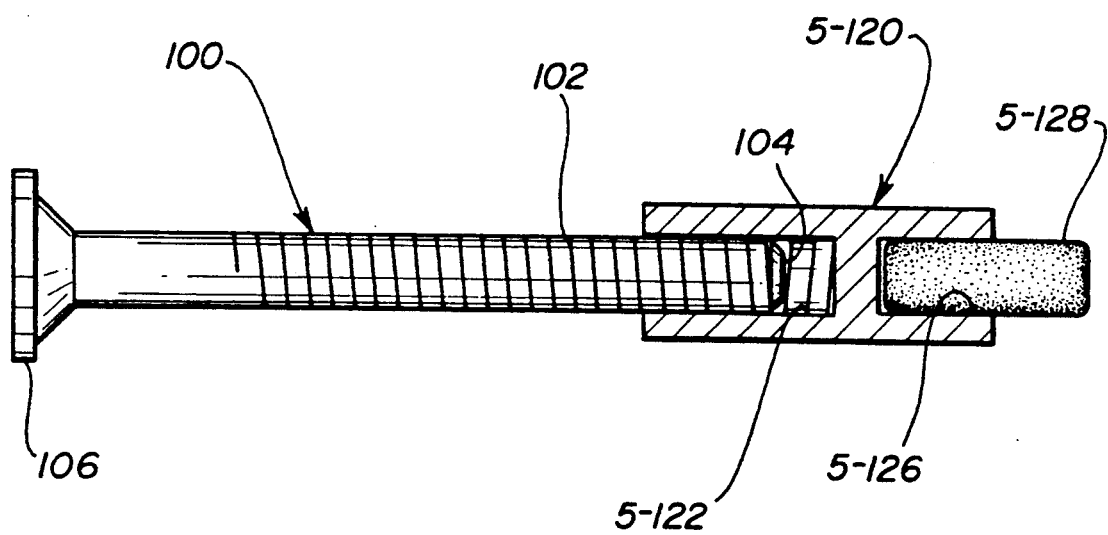
FIG. 5 is a plane view of an alternate embodiment of the indicator screw of the portable truing system of FIG. 1 with a marker holder and a marker attached to the contacting tip of the indicator screw.

In an alternative embodiment, a marking means 5-120, as shown in FIG. 5, may be attached to the contacting tip 104 of indicator screw 100. Marking means 5-120 comprises an internal threaded end 5-122 which coacts with the contacting tip 104 by being threaded over the contacting tip 104 and onto the threaded shank 102. An indicator holding end 5-126 contains a receptacle into which a marker 5-128 may be installed. This marker is typically a piece of chalk or rubber material which will provide an easily erasable mark on the rim of the wheel where the rim contacts the indicator means.

The indicator screw 100 with marker holder 5-120 attached is adjusted by advancing or retracting indicator screw 100 until the marker 5-128 contacts the rim of the wheel. The indicator screw 100 is then backed off about one half turn to leave a gap between the marker 5-128 and the rim of the wheel. To adjust the wheel, the wheel is rotated and wherever the wheel contacts the marker, a mark is made on the wheel. The corresponding spokes are then retensioned to restore the wheel to its proper truing plane, these marks are rubbed off and the process is repeated until the wheel can be rotated without receiving any marks on the rim thereof. The truing system may then be moved to the opposite fork and the entire process repeated to ensure that the wheel is properly trued.

Thus the portable truing system of the present invention provides a method and apparatus for quickly and easily truing a bicycle wheel to achieve roundness of the wheel and positioning of the wheel in a flat plane to enhance efficiency of the bicycle, to thereby benefit the cyclist. The portable truing system of the present invention provides an apparatus and method for truing a bicycle wheel that does not require the wheel to be removed from the bicycle, thus, simplifying and quickening the conventional procedure for truing a wheel. With the present invention, a wheel may be trued without requirement of special tools or the knowledge of elaborate machinery.

It will be understood that various changes in the details, materials, and arrangements of parts which have been described and illustrated in order to explain the nature of the invention may be made by those skilled in the art within the principle and scope of the invention as expressed in the appended claims.

What is claimed is:

1. A portable truing system comprising:
    a block adapted to be mounted to a structural member of a vehicle connected to the axle of a spoked wheel, said block comprising:
        a proximate side;
        a remote side;
        a front and rear side, one of said front and rear sides having means therein for coacting with the structural member for positioning and disposing the block on the structural member;

securing means to secure the block to the structural member of a vehicle connected to the axle of the spoked wheel comprising:

a strap;

fastening means to fasten the strap to the block; and attaching means to fasten the strap to the structural member;

indicator positioning means connected to the block comprising an arm extending from the block and a threaded passage in said arm disposed perpendicular to the plane of the spoked wheel, and parallel to the axis of the wheel; and indicator means disposed in said indicator positioning means, said indicator means comprising:

a threaded shank for coacting with said threaded passage for adjustment of said indicator means;

a contacting tip at the end of said indicator means adapted to contact the rim of the spoked wheel disposed adjacent to the structural member connected to the axle of the spoked wheel; and an adjustment head integral to said indicator means for advancing or retracting the contacting tip in relation to the rim of the spoked wheel.

2. The device as claimed in claim 1, further comprising restraining means for said indicator means, attached to the indicator means and coacting with said indicator positioning means to resist rotation of said indicator means, said restraining means comprising a locking nut threaded on the threaded shank of said indicator means.

3. The device as claimed in claim 2, further comprising:

marking means disposed on the end of said contacting tip of said indicator means;

said marking means comprising threaded end means adapted to coact with the threaded shank of the indicator means;

an indicator holding end;

a marker means;

said marker means mounted on the indicator holding end;

the indicator holding end remote from the threaded end of said marking means; and the marker means including a chalk material mounted in said indicator holding end and adapted to mark a portion of the rim of the spoked wheel in which it comes in contact.

4. The device as claimed in claim 1, further comprising indicia means on said block for indicating the position of said block with respect to the structural member of the vehicle.

* * * * *